Figure 1:
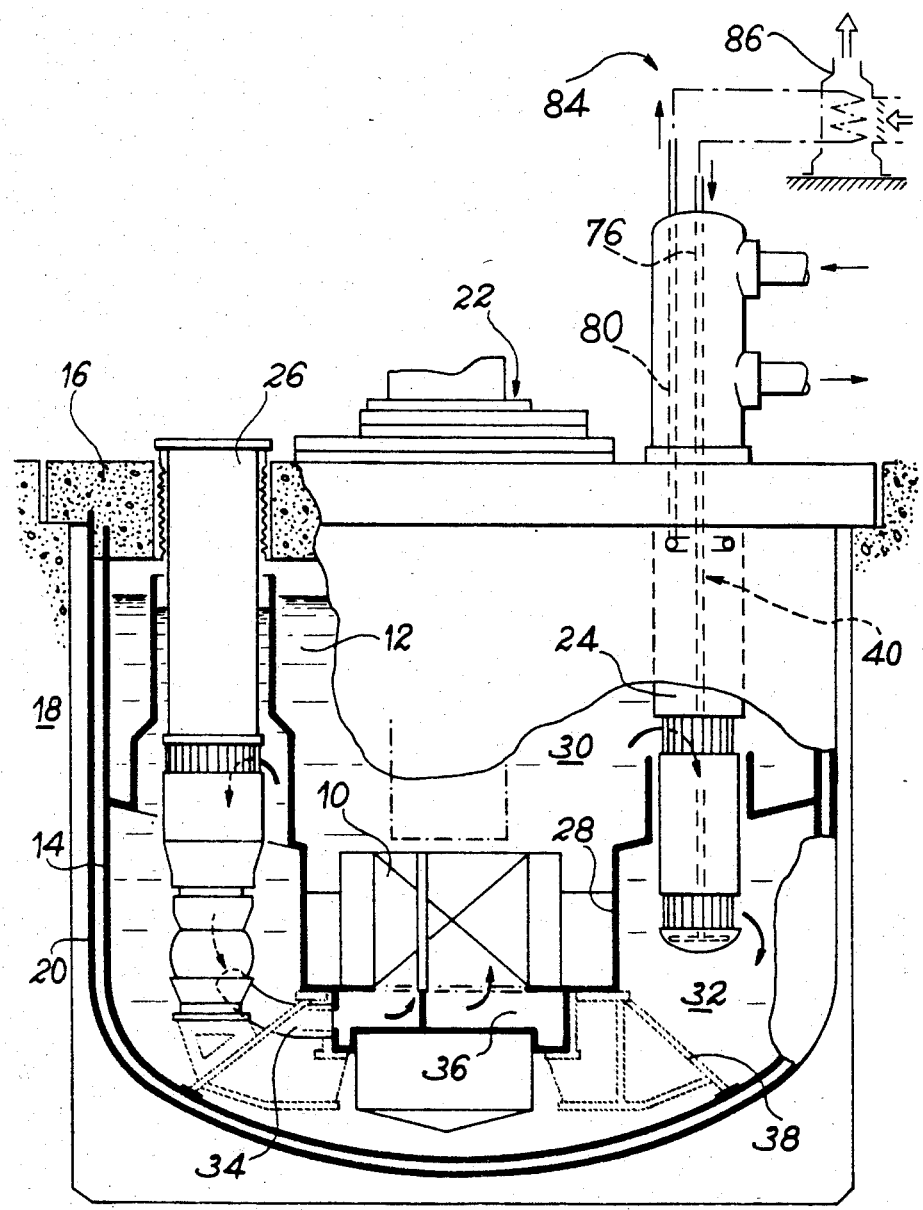

United States Patent [19]

Massé

[11] Patent Number: 4,698,201

[45] Date of Patent: Oct. 6, 1987

[54] HEAT EXCHANGER EQUIPPED WITH EMERGENCY COOLING MEANS AND FAST NEUTRON NUCLEAR REACTOR INCORPORATING SUCH AN EXCHANGER

[75] Inventor: Jean Massé, Manosque, France

[73] Assignees: Commissariat a l'Energie Atomique; Service National Electricite de France, both of Paris, France

[21] Appl. No.: 696,732

[22] Filed: Jan. 31, 1985

[30] Foreign Application Priority Data

Feb. 14, 1984 [FR] France ............................... 84 02214

[51] Int. Cl.$^4$ ............................................... G21C 15/18
[52] U.S. Cl. ............................... 376/298; 165/104.19; 376/299; 376/405
[58] Field of Search ................... 165/104.19; 376/298, 376/299, 402, 403, 404, 405

[56] References Cited

U.S. PATENT DOCUMENTS 2,800,307  7/1957  Putney .......................... 165/104.19
4,148,686  4/1979  Pouderoux ........................ 376/298
4,235,284  11/1980  Coleman ........................... 376/298

FOREIGN PATENT DOCUMENTS 0004218  9/1979  European Pat. Off. .
0026697  4/1981  European Pat. Off. .
0068913  1/1983  European Pat. Off. .

Primary Examiner—Deborah L. Kyle
Assistant Examiner—Richard W. Wendtland

[57] ABSTRACT

The invention relates to a heat exchanger incorporating emergency cooling means, as well as to a fast neutron nuclear reactor incorporating such an exchanger.

The emergency cooling means comprise an inlet pipe issuing into the secondary fluid inlet chamber and an outlet pipe issuing into the secondary fluid outlet chamber. The inlet pipe issues into a distributing ramp positioned below the lower tue plate and the outlet pipe issues into a collecting ramp positioned above the upper tube plate. The two ramps are positioned below the intake and discharge pipes for the secondary fluid.

5 Claims, 2 Drawing Figures

HEAT EXCHANGER EQUIPPED WITH EMERGENCY COOLING MEANS AND FAST NEUTRON NUCLEAR REACTOR INCORPORATING SUCH AN EXCHANGER

The present invention relates to a heat exchanger incorporating emergency cooling means for the primary fluid. The invention also relates to a fast neutron nuclear reactor incorporating one or more exchangers of this type.

In a fast neutron nuclear reactor, the reactor core is immersed in a liquid metal, such as sodium contained in a vertically axed vessel sealed in its upper part by a horizontal sealing slab. In normal operation, the heat given off by the fission reaction in the reactor core is absorbed by the liquid metal contained in the vessel. This heat is then transmitted by heat exchangers to a secondary fluid, generally constituted by liquid sodium. The circulation of the primary liquid metal contained in the reactor vessel between the core and the exchangers is controlled by pumps.

In fast neutron nuclear reactors of the integrated type, such as Phenix and Super-Phenix reactors the complete primary circuit, including the pumps and exchangers, is located within the reactor vessel. However, in fast neutron nuclear reactors of the loop type, part of the primary circuit including the exchangers and sometimes also the pumps is located outside the reactor vessel.

In the case of an operating incident leading to the stoppage of the primary pumps, the fission reaction is immediately stopped, as a result of the dropping of the scram rods. However, the core of the reactor still gives off a high residual calorific power. In order to prevent local melting of the core, this residual power must be reliably and effectively eliminated.

For this purpose, it is conventional practice to equip fast neutron nuclear reactors with loops for cooling the shutdown reactor. As is more particularly illustrated in French Patent Application No. 78 06435 in the name of the Commissariat a l'Energie Atomique, these cooling loops generally incorporate heat exchangers, which are directly immersed in the liquid metal contained in the vessel and pumps ensuring the circulation of the liquid metal (generally sodium) circulating in these loops. Thus, the residual power of the core is removed by liquid metal-air exchangers.

Although these shutdown reactor cooling loops have quite satisfactory operating characteristics they still suffer from a number of disadvantages. Thus, the presence within the reactor vessel of exchangers serving to cool the shutdown reactor and which are separate from the main exchangers lead to an increase in the number of components present within the vessel. Apart from the direct increase in costs resulting from the increase in the number of components, this leads to an increase in the diameter of the vessel and consequently in the reactor costs. This also leads to a rise in the number of passages through the slab by components, which also contributes to increasing the cost of the reactor.

The present invention relates to a heat exchanger incorporating emergency cooling means making it possible to replace the emergency cooling exchangers conventionally used in fast neutron reactors. The elimination of the latter makes it possible to prevent all the disadvantages resulting from their presence in the reactor vessel. Moreover, the emergency cooling means incorporated into the exchanger according to the invention are designed in such a way that they can operate with natural convection.

Moreover, although the invention is more particularly intended for use in an integrated fast neutron nuclear reactor, it is not limited thereto and can be used in all cases where it is necessary to add an emergency cooling system to a conventional heat exchanger. In the same way, although the invention is particularly appropriate in the case of integrated fast neutron reactors, it can also be used in loop-type fast neutron reactors.

The present invention specifically relates to a heat exchanger incorporating a vertically axed cylindrical envelope, in which is located a bundle of vertical tubes, whose ends are respectively fixed to a lower tube plate and to an upper tube plate and which respectively issue into an inlet chamber and an outlet chamber for the secondary fluid, an intake pipe and a discharge pipe for the secondary fluid respectively communicating with the inlet chamber and the outlet chamber, and inlet and outlet for the primary fluid formed in that part of the envelope which surrounds the bundle of tubes, wherein the exchanger also comprises emergency cooling means for the primary fluid incorporating an inlet pipe and an outlet pipe which can be connected to external cooling means and which respectively issue into the inlet chamber and the outlet chamber for the secondary fluid below the intake and discharge pipes.

According to a preferred embodiment of the invention, the inlet pipe is connected to a distribution ramp positioned beneath the lower tube plate and the outlet pipe is connected to a collecting ramp positioned above the upper tube plate.

The invention also relates to a fast neutron nuclear reactor comprising a vessel filled with liquid metal and sealed at its upper end by a slab, at least one pump ensuring the circulation of the liquid metal between the reactor core and at least one heat exchanger suspended on the slab, wherein said heat exchanger has a device for removing the residual power integrated in accordance with the invention, the primary fluid circulating in the exchanger and the liquid metal contained in the vessel and the reactor also comprising external cooling means, such as a liquid metal-air exchanger connected between the inlet pipe and outlet pipe of the exchanger.

Although in such a reactor, the means for cooling the shutdown reactor, can operate in natural convection, pumping means can also be interposed between the exchanger and the external cooling means.

The invention is described in greater detail hereinafter relative to a preferred embodiment and with reference to the attached drawings, wherein show:

FIG. 1 a diagrammatic view in partial cross-section of a fast neutron nuclear reactor incorporating heat exchangers equipped with devices for removing the integrated residual power according to the invention.

Figure 2:
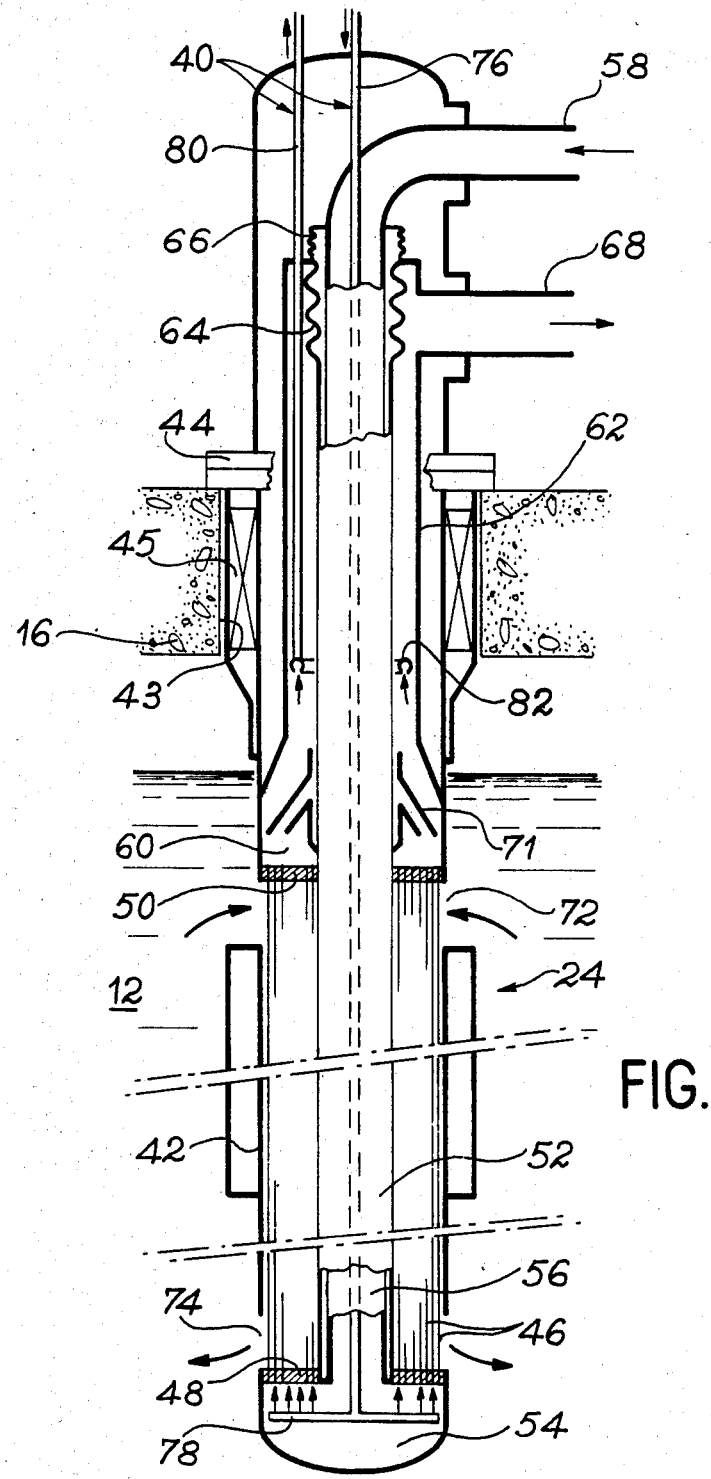

FIG. 2 a larger scale sectional view showing one of the heat exchangers of the reactor of FIG. 1.

FIG. 1 diagrammatically shows an integrated fast neutron nuclear reactor. The reactor core 10 is immersed in a liquid cooling metal 12, (conventionally sodium), contained in a vertically axed vessel 14. The upper part of vessel 14 is sealed by a horizontal sealing slab 16, whose periphery rests on a vessel shaft 18. Vessel 14, called the main vessel, is duplicated within the vessel shaft 18 by a safety vessel 20, which is generally suspended on slab 16 in the same way as vessel 14.

In reactors of the integrated type, like that diagrammatically shown in FIG. 1, slab 16 is traversed by a series of components necessary for the operation of the reactor. Thus, the central part of the slab supports a system of rotary plugs 22, whilst its peripheral part supports the heat exchangers 24 and the primary pumps 26 which are regularly distributed around the core and whereof only one component of each type is shown in the drawing. An inner vessel 28 defines within the vessel 14 a hot collector 30 containing the hot liquid metal issuing into the upper end of the core and a cold collector 32 in which is collected the liquid metal leaving the exchangers 24. The liquid metal is then taken up by pumps 26 and is delivered by ducts 34 to a bearing member 36 which both supplies liquid metal to core 10 and supports the core on the bottom of vessel 14 by flooring 38. In operation, the liquid metal consequently circulates permanently through the core and the exchangers. The latter ensure the extraction of the heat given off by the fission reaction. This heat is then transferred to a not shown secondary circuit before being used in the turbines of a water-steam circuit for producing electricity.

According to the invention, into each of the heat exchangers 24 is introduced a shutdown reactor cooling system 40. The latter, as stated hereinbefore, removes the residual calorific power which the reactor core continues to give off in the case of a stoppage of the primary pumps 26, despite the dropping of the safety rods.

Taking account of this special installation of the shutdown reactor cooling system within the exchangers, a more detailed description will now be given of the construction of the latter with reference to FIG. 2.

FIG. 2 shows that each of the exchangers 24 of the reactor of FIG. 1 comprises a vertically axed external cylindrical envelope 42. Envelope 42 traverses in per se known manner a passage 43 formed in slab 16 and rests on the upper face thereof by means of a flange 44. The space left free between passage 44 and envelope 42 to permit the disassembly of the exchanger is filled with a thermal insulation system, diagrammatically represented at 45.

That part of exchanger 24 below slab 16 consists of the actual exchanger, whilst that part of the exchanger located above the slab constitutes the exchanger head, by means of which the exchanger is connected to the other component of the corresponding secondary loop.

The actual exchanger, which is immersed in the primary liquid metal 12, comprises a bundle of vertical straight tubes 46 housed in the envelope 42. The ends of tubes 46 are fixed in per se known manner respectively to a lower horizontal tube plate 48 and to an upper horizontal tube plate 50. These two plates 48, 50 are themselves fixed by their outer periphery to the envelope and by their inner periphery to a tube 52, whose vertical axis coincides with that of the envelope and which extends from the lower tube plate 48 above slab 16.

Inlet 72 and outlet 74 for the primary liquid metal 12 are formed in envelope 42, respectively below the upper tube plate 50 and above the lower tube plate 48. These openings enable the liquid metal 12 to circulate from top to bottom around tubes 46 in the annular space formed between envelope 42 and tube 52.

Below the lower tube plate 48, tubes 46 issue into an inlet chamber 54 for the secondary fluid. Chamber 54 is defined at its lower end by the base of envelope 42. It is extended upwards within a vertical shaft 56 arranged coaxially in tube 52.

At its upper end, positioned just below the dome of the exchanger envelope, shaft 56 is bent at right angles to connect to an intake pipe 58 for the secondary fluid and which passes through the exchanger envelope 42. In a comparable manner, tubes 46 issue above the upper tube plate 50 into an annular outlet chamber 60. The latter is extended upwards above slab 16 in the form of an annular space formed between tube 52 and an inner envelope 62. The latter is arranged coaxially between tube 52 and outer envelope 42 and its lower truncated cone-shaped end is fixed to the latter above the upper tube plate 50. Envelope 62 is terminated below the intake pipe 58 in the form of a planar upper face connected by a deformable sealing bellows 64, 66 respectively to the upper end of tube 52 and to the shaft 56. The upper end of chamber 60 issues into a discharge pipe 68, which sealingly traverses the exchanger envelope 42.

In order to complete the description of the exchanger, it is pointed out that a mixer 71 can be fixed to tube 52 within the discharge chamber 60, just above tube plate 50.

In normal operation, the secondary liquid metal (generally sodium) introduced by pipe 58 drops into the exchanger through the shaft 56 of inlet chamber 54. It then rises into the bundle of tubes 46 for the accumulation of heat, which is transmitted thereto by the primary liquid metal 12, circulating around the tubes. It finally rises into the outlet chamber 60 and leaves the exchanger via pipe 68.

According to the invention the exchanger shown in FIG. 2 also comprises emergency cooling means 40 for the primary liquid metal 12 circulating around tube 46.

These emergency cooling means 40 comprise a first vertical tube 76 arranged in accordance with the exchanger axis. Tube 76 successively traverses the upper dome of envelope 42 and the bent part of shaft 56, then dropping within the latter to the part of the inlet chamber 54 located below the lower tube plate 48. At this level, the vertical tube 76 is connected to a distribution ramp 78 located below the lower tube plate 48. Ramp 78 has openings on its upper face facing tube plate 48.

The emergency cooling means 40 also comprise a vertical outlet pipe 80 displaced with respect to the exchanger axis and successively traversing the upper dome of envelope 42 and the planar upper face of envelope 62. The lower end of the outlet pipe 80 is approximately level with the lower face of slab 16. Pipe 80 is connected at this level to an annular collecting ramp 82, whose lower part has openings over the entire circumference of outlet chamber 60.

According to the invention, the inlet pipe 76 and outlet pipe 80 both issue below the discharge pipe 68 of the secondary loop, the latter being in turn below the intake pipe 58. Thus, the secondary part of exchanger 24 in which are immersed the pipes 76 and 80 remains submerged in the secondary liquid metal, even when the corresponding secondary loop is emptied.

On referring once again to FIG. 1, it can be seen that the cooling loop 84 for the shutdown reactor comprises, within exchanger 24, a per se known liquid metal-air exchanger, which is diagrammatically represented at 26. This loop 84 can also have a circulating pump e.g. of the electromagnetic type. However, the circulation of secondary liquid metal within the loop 84 is automatically ensured by natural convection, so that such a pump is not indispensable for the purposes of the invention.

As a result of the features of the invention, it can be seen that in the case of stoppage of the primary pumps and the dropping of the safety rods into the reactor core, the residual power which the latter continues to give off is removed by a natural convection circulation or optionally a forced circulation with the aid of a pump of the secondary liquid metal contained in the exchanger. Thus, as is indicated by the arrows in FIG. 2, the said liquid metal then circulates from bottom to top between the distribution ramp 78 and the collecting ramp 82 within tubes 46 of the exchanger in order to extract the heat carried by the primary liquid metal and which circulates around the tubes between inlet 72 and outlet 74. The reheated liquid metal removed by the collecting ramp 82 is passed by the outlet pipe 80 and the outer loop 84 to a liquid metal-air exchanger 86, where it is once again cooled. The liquid metal then returns by the inlet pipe 76 to the distribution ramp 78, where a new cycle is started.

In view of the arrangement of ramps 82 and 78 below pipes 68 and 58, the shutdown reactor cooling system formed in this way can still be used if the reactor secondary circuits are unavailable. Furthermore, the description given shows that the system is particularly simple. Moreover, it is very reliable if all the exchangers 24 are equipped therewith. As has already been stated, it also has the advantage of being able to function in natural convection, which is an important advantage from the safety standpoint.

Obviously the invention is not limited to the embodiment described in exemplified manner hereinbefore, and in fact covers all variants thereof. Thus, as has been shown, the invention is not limited to a heat exchanger for use between the primary and secondary circuits of an integrated fast neutron nuclear reactor. It is readily apparent that such a system could also be used in an exchanger placed between the primary and secondary circuits of a loop-like fast neutron reactor. In more general terms, an exchanger according to the invention can also be used in any other case requiring emergency cooling means for the primary fluid having a reduced capacity compared with the heat exchange capacity of the exchanger in normal operation.

When used in a nuclear reactor, the exchanger according to the invention could optionally be associated with conventional exchangers.

With regards to the actual exchanger, it is obvious that the invention can apply to all exchangers, in which the discharge and intake pipes for the secondary fluid are located in the upper part of the exchanger envelope. Thus, it is then possible to make the inlet and outlet pipes of the emergency cooling means issue below said intake and discharge pipes in order to ensure the operation of the emergency cooling system, even in the cases of draining of the secondary circuit. In the same way, the distribution ramp and the collecting ramp could be modified or eliminated without passing beyond the scope of the invention.

What is claimed is:

1. A heat exchanger incorporating a vertically axed cylindrical envelope, in which is located a bundle of vertical tubes, whose ends are respectively fixed to a lower tube plate and to an upper tube plate and which respectively issue into an inlet chamber and an outlet chamber for a secondary liquid, an intake pipe and a discharge pipe for the secondary liquid respectively communicating with the inlet chamber and the outlet chamber, and inlet and outlet for a primary fluid formed in that part of the envelope which surrounds the bundle of tubes, wherein the exchanger also comprises emergency cooling means for the primary fluid incorporating an inlet pipe and an outlet pipe which are connectable to external cooling means and which respectively issue into the inlet chamber and the outlet chamber for the secondary liquid below the intake and discharge pipes.

2. A fast neutron nuclear reactor comprising a vessel filled with liquid metal and sealed at its upper end by a slab, at least one pump ensuring the circulation of liquid metal between the reactor core and at least one heat exchanger suspended on the slab, wherein said heat exchanger comprises a vertically axed cylindrical envelope, in which is located a bundle of vertical tubes, whose ends are respectively fixed to a lower tube plate and to an upper tube plate and which respectively issue into an inlet chamber and into an outlet chamber for an secondary liquid, an intake pipe and a discharge pipe for the secondary liquid respectively communicating with the inlet chamber and the outlet chamber, and an inlet and an outlet for a primary fluid formed in that part of the envelope surrounding the bundle of tubes, the exchanger comprising additionally an emergency cooling means for the primary fluid having an inlet pipe and an outlet pipe which are connectable to external cooling means which respectively issue into the inlet chamber and into the outlet chamber for the secondary liquid below said intake and discharge pipes, the primary fluid being the liquid metal contained in the vessel, whilst the reactor also comprises external cooling means connected between the exchanger inlet and outlet pipes.

3. A reactor according to claim 2, wherein the pumping means are positioned between the exchanger and the external cooling means.

4. A heat exchanger incorporating a vertically axed cylindrical envelope, in which is located a bundle of vertical tubes, whose ends are respectively fixed to a lower tube plate and to an upper tube plate and which respectively issue into an inlet chamber and an outlet chamber for a secondary liquid, an intake pipe and a discharge pipe for the secondary liquid respectively communicating with the inlet chamber and the outlet chamber, and inlet and outlet for a primary fluid formed in that part of the envelope which surrounds the bundle of tubes, wherein the exchanger also comprises emergency cooling means for the primary fluid incorporating an inlet pipe and an outlet pipe which are connectable to external cooling means and which respectively issue into the inlet chamber and the outlet chamber for the secondary liquid below the intake and discharge pipes, said inlet pipe being connected to a distribution ramp housed beneath the lower tube plate.

5. A heat exchanger incorporating a vertically axed cylindrical envelope, in which is located a bundle of vertical tubes, whose ends are respectively fixed to a lower tube plate and to an upper tube plate and which respectively issue into an inlet chamber and an outlet chamber for a secondary liquid, an intake pipe and a discharge pipe for the secondary liquid respectively communicatinbg with the inlet chamber and the outlet chamber, and inlet and outlet for a primary fluid formed in that part of the envelope which surrounds the bundle of tubes, wherein the exchanger also comprises emergency cooling means for the primary fluid incorporating an inlet pipe and an outlet pipe which are connectable to external cooling means and which respectively issue into the inlet chamber and the outlet chamber for the secondary liquid below the intake and discharge pipes, said outlet pipes being connected to a collecting ramp located above the upper tube plate.

* * * * *